United States Patent [19]

Wolf

[11] Patent Number: 5,569,386
[45] Date of Patent: Oct. 29, 1996

[54] METHOD FOR CONTROLLING THE DETOXIFICATION OF CYANIDIC WASTE WATERS

[75] Inventor: Hubert Wolf, Hammersbach, Germany

[73] Assignee: Degussa Aktiengesellschaft, Frankfurt am Main, Germany

[21] Appl. No.: 353,290

[22] Filed: Dec. 5, 1994

[30]     Foreign Application Priority Data

Dec. 24, 1993 [DE]    Germany .......................... 43 44 598.5

[51] Int. Cl.⁶ .................................. C02F 1/72; C02F 1/62
[52] U.S. Cl. .......................... 210/746; 210/758; 210/904; 210/912; 210/743
[58] Field of Search .................................... 210/758, 746, 210/912, 904, 743

[56]                References Cited

U.S. PATENT DOCUMENTS

| | | | |
|---|---|---|---|
| 3,617,582 | 11/1971 | Lawes | 210/63 |
| 4,731,232 | 3/1988 | Fischer et al. | 423/236 |
| 5,204,008 | 4/1993 | Diehl et al. | 210/759 |
| 5,207,925 | 5/1993 | Steiner et al. | 210/746 |
| 5,306,431 | 4/1994 | Fischer et al. | 210/746 |

*Primary Examiner*—Neil McCarthy
*Attorney, Agent, or Firm*—Beveridge, DeGrandi, Weilacher & Young

[57]                ABSTRACT

A method for controlling the detoxification of aqueous solutions containing cyanides and/or cyano complexes, in particular zinc cyano complexes, with the use of a source for formaldehyde for glycolnitrile formation and a source for hydrogen peroxide for perhydrolysis of the glycolnitrile is disclosed. During the addition of the source for formaldehyde at a pH value in the range from 8.5 to 12 the pH value is kept constant by addition of an acid. The addition of the source for formaldehyde is discontinued if the pH value no longer increases.

9 Claims, No Drawings

METHOD FOR CONTROLLING THE DETOXIFICATION OF CYANIDIC WASTE WATERS

INTRODUCTION AND BACKGROUND

The present invention relates to a method for controlling the detoxification of aqueous solutions, in particular waste waters, containing cyanides and/or unstable cyano complexes. In particular the present invention relates to a method for treating waste waters containing zinc cyano complexes, wherein in a first stage free cyanide and that released from cyano complexes is converted into glycolnitrile by the addition of formaldehyde or a compound capable of releasing formaldehyde under the process conditions. In a second stage the glycolnitrile formed in the first stage is decomposed by perhydrolysis by the addition of a source for hydrogen peroxide.

The detoxification of cyanidic waste waters, such as are obtained in various branches of industry, for example in the mining industry, in metal hardening plants and electroplating works, with the use of per-oxygen compounds, such as in particular hydrogen peroxide and persulphates, has been known for a long time. In order to reduce the reaction time for the detoxification, the additional use of heavy-metal catalysts is often necessary—see French patent 1 564 915. A disadvantage with the additional use of heavy-metal catalysts is that in many cases they catalyze the decomposition of the hydrogen peroxide before completion of the cyanide detoxification, so that a sufficient degree of detoxification is not achieved. A further disadvantage of this known method with the use of heavy-metal catalysts resides in the fact that the recovery in sufficiently pure form of useful materials contained in the waste water to be treated, for instance the recovery of zinc from waste waters from cyanidic galvanizing, is prevented or rendered unduly complicated.

According to another known method hydrogen peroxide is used for the detoxification of cyanidic solutions in combination with formaldehyde; see U.S. Pat. No. 3,617,582. The reaction takes place in two stages, wherein in the first stage formaldehyde cyanohydrin, which is also known as glycolnitrile, is formed. In the second stage perhydrolysis with the use of hydrogen peroxide is involved, wherein glycolnitrile is decomposed to glycolic acid amide and glycolic acid. In the method according to the above-mentioned U.S. Pat. No. 3,617,582 the detoxification takes place at a pH value in the range from 9 to 12.5. Formaldehyde can be used in the form of an aqueous solution or a compound releasing formaldehyde, such as for example paraformaldehyde. Instead of hydrogen peroxide, compounds releasing hydrogen peroxide, such as perborates or percarbonates, can also be used for the perhydrolysis. Such sources of hydrogen peroxide are well known in the art. Formaldehyde and hydrogen peroxide are added to the solution to be detoxified in particular molar ratios, calculated on the previously determined content of cyanide. A suggestion for controlling the detoxification of solutions, the cyanide content of which is unknown, is not given in this prior art document; that is, in the prior known method the cyanide content always had to be determined prior to the actual detoxification. In the case of detoxification methods in particular, however, there is an interest at a practical level in easily controllable methods which make a cyanide determination prior to the detoxification superfluous.

A method is known from U.S. Pat. No. 4,731,232 for the purifying of gas wash waters containing cyanides, which is based on the treatment of the wash water with formaldehyde and a subsequent oxidation step with the use of hydrogen peroxide. In this method the charging of formaldehyde takes place as a function of the cyanide-specific redox potential, which is measured in a side flow diverted from the main flow with the use of a noble metal electrode and a reference electrode. Because of the pH-dependence of the redox potential the pH value of the side flow is adjusted to a value between 7 and 10 and kept constant. In addition silver ions are introduced into the side flow. The regulation of the addition of hydrogen peroxide takes place once again as a function of the redox potential measured. It is a disadvantage of the method described that limits are set to a control of the addition of the required chemicals by means of the measured redox potentials, because always only one mixed potential is measured. In the case of solutions with fluctuating compositions, such as are obtained in particular in electroplating plants, the above-mentioned control technique is therefore often not sufficient, because either under-charging or over-charging of formaldehyde can occur. This is accompanied in some cases with an insufficient degree of detoxification and/or an excessive consumption of chemicals.

SUMMARY OF THE INVENTION

An object of the present invention is therefore to improve the prior known method for the detoxification of cyanidic waste waters with the use of formaldehyde and hydrogen peroxide in such a way that the detoxification can be controlled in a simple and reliable manner, and so that an optimal detoxification result is achieved with the minimum possible consumption of formaldehyde and hydrogen peroxide.

In achieving the above and other objects of the invention, one feature resides in a method for controlling the detoxification of aqueous solutions, in particular waste waters, containing cyanides and/or unstable heavy-metal cyano complexes, in particular zinc cyano complexes, in the stages:

(i) continuous or periodic addition of a source for formaldehyde to the aqueous solution to be treated at a pH value in the range from 8.5 to 12, wherein free and released cyanide is converted into glycolnitrile, and afterwards (ii) perhydrolysis of the glycolnitrile by continuous or periodic addition of a source for hydrogen peroxide at a pH value in the range from 8.5 to 12, wherein the redox potential is measured and the addition discontinued if the redox potential no longer increases with the pH value kept constant, which is characterized in that during stage (i) the pH value is kept substantially constant by pH-controlled addition of an acid and the addition of formaldehyde is discontinued if the pH value no longer increases as a result. No prior analysis of the waste water to be treated is required and hence this is an advantage of the present invention.

DETAILED DESCRIPTION OF THE INVENTION

The method according to the invention is suitable in particular for the detoxification of waste waters containing free cyanide, such as those from hardening plants, for instance, and for the detoxification of waste waters containing zinc cyano complexes, such as are obtained during galvanizing in electroplating works. After the actual detoxification, zinc hydroxide can be separated easily at a pH value of about 9 and subjected to recycling. Waste waters containing cadmium cyano complexes can also be detoxified without difficulty, since these complexes, like the zinc cyano complexes, are unstable complexes. The presence of small amounts of cyano complexes of Ni, Cu, Ag and Au in such waste waters does not cause a problem. On the contrary, the latter are also detoxified.

The control in stage (i) is possible by virtue of the formation reaction of glycolnitrile

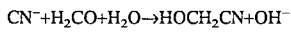

Broadly stated, the method aspect of the invention resides in a method for controlling the detoxification of aqueous solutions containing cyanides, unstable heavy-metal cyano complexes or mixtures thereof. Of particular interest are those solutions wherein the composition of the aqueous solutions can change substantially. The method comprises the stages of:

(i) adding a source for formaldehyde to the aqueous solution to be treated at a pH value in the range from 8.5 to 12, wherein free and released cyanide is converted into glycolnitrile, and afterwards (ii) carrying out a perhydrolysis of the glycolnitrile by adding a source of hydrogen peroxide at a pH value in the range from 8.5 to 12, wherein the redox potential is measured and the addition discontinued if the redox potential no longer increases with the pH value kept constant. During stage (i) the pH value is kept substantially constant by pH-controlled addition of an acid, typically a mineral acid such as hydrochloric acid, and the addition of formaldehyde is discontinued if the pH value no longer increases as a result.

Preferably the pH value lies both in stage (i) and in stage (ii) in the range from 9 to 11, in particular in the range from 9.5 to 10.5. There is to be understood by the definition according to which the pH value is kept substantially constant that the pH value deviates from the set value by not more than ±0.5 and preferably less than ±0.2 units. For the addition of the acid in stage (i) and the base in stage (ii) a metering pump connected to the respective storage vessel or a diaphragm valve is conventionally controlled by a pH controller with a P- (proportional), PI- (proportional-integral) or PID- (proportional-integral-differential) characteristic.

In stage (ii) a source for hydrogen peroxide is charged in a manner known per se. During the oxidation the pH value drops without addition of a base. If the pH value is kept constant, the redox potential increases during the oxidation until the oxidation is completed. If an Ag electrode and Thalamide reference electrode are used, the maximum potential conventionally lies mostly in the range between 650 to 750 mV.

An appropriate apparatus for carrying out the method according to the invention with the use of an aqueous $H_2O_2$ and aqueous $H_2CO$ solution as source for $H_2O_2$ and $H_2CO$ incorporates a reaction vessel with inlet and outlet lines for the water to be treated, a mixing device, for example an agitator or a circulating pump, a pH electrode, a redox electrode as well as inlet lines from storage vessels for the aqueous $H_2CO$ and $H_2O_2$ solution as well as the acid and base and, where necessary, an activator. The inlet lines are, if the storage vessels are positioned above the reaction tank, preferably equipped with control valves, for example solenoid valves, which are controlled in accordance with the measured pH value and redox potential from a control panel.

In the method according to the invention there is used in the first stage a source for formaldehyde, preferably an aqueous formaldehyde solution or an oligomeric formaldehyde or paraformaldehyde depolymerizable under the reaction conditions. Preferred are commercially available aqueous formaldehyde solutions, which can also contain conventional stabilizers such as for example methanol. During the addition of the source for formaldehyde to the aqueous solution to be detoxified, for instance a waste water, the pH value rises. To enable the pH value to be kept substantially constant, therefore, an acid, conventionally a mineral acid, preferably hydrochloric acid or sulphuric acid, has to be added in an equivalent amount. Suitable compounds are known in the art capable of generating formaldehyde under the conditions of the reaction herein.

Depending on the nature of the control selected—manually or by means of a pH controller—the acid is added continuously, clock-pulsed or periodically in another manner. On attainment of the equivalence point—the whole of the free cyanide and that released from the cyano complexes under the selected conditions occurs in the form of glycolnitrile—no further change in pH occurs, so that both the feeding of formaldehyde and the feeding of acid are discontinued at this point. In contrast to the redox potential used for the control in the previously known method, the pH value is in the method according to the invention influenced only by the glycolnitrile formation reaction in the first stage; overcharging or under-charging of formaldehyde is prevented in this way.

In the second stage of the method according to the invention a source for hydrogen peroxide, preferably an aqueous hydrogen peroxide solution, is used for the purpose of perhydrolysis. Instead of hydrogen peroxide, however, other per-oxygen compounds can also be used, which release hydrogen peroxide in aqueous phase under the condition of the process carried out herein. Of these compounds, perborates, such as in particular sodium perborate in the form of the so-called monohydrate or tetrahydrate as well as sodium percarbonate ($2\ Na_2CO_3.3\ H_2O_2$) must be highlighted; perborates can be added as such or formed in situ from a source for borate, such as boric acid or metaborate, and $H_2O_2$; alkaline earth peroxides, such as in particular calcium peroxide, which can be added as such or formed in situ from alkaline earth ions and $H_2O_2$, are also suitable. Whereas hydrogen peroxide is used as an aqueous solution of any concentration, preferably concentration usual in the trade with an $H_2O_2$ content between 35 and 70 wt. %, the aforementioned perborates or percarbonates can be added in the form of an aqueous solution or suspension or in the form of the solid salt.

Before or during the charging of the source for hydrogen peroxide, stabilizers for hydrogen peroxide, for example those from the series of the magnesium salts, silicates or phosphates, can also be added in effective amounts to the waste water to be treated. Side by side with the perhydrolysis of glycolnitrile, other oxidizable substances which are contained in the waste water to be treated are also oxidized by the source for hydrogen peroxide in the second stage.

In order to keep the pH value substantially constant during the addition of the source for hydrogen peroxide and hence to enable the end of the addition to be recognized by the absence of a further rise in redox potential, a base is added continuously, clock-pulsed or in a periodic manner of another manner. Aqueous solutions reacting alkaline are conventionally used as a base; preferred are alkali solutions, in particular sodium hydroxide solutions.

On completion of the detoxification, where this is necessary after further adjustment of the pH value, metal hydroxide sludge present can be separated and the remaining water disposed of, e.g. in the main outfall or a biological treatment plant.

The method according to the invention permits a reliable control of the detoxification of cyanidic waste waters with differing compositions in batch-wise or continuous methods. A cyanide determination prior to the detoxification is not necessary. For the control of the first stage of the method a pH-controlled addition of the source for formaldehyde and an acid is sufficient to prevent over-charging of the chemicals and achieve satisfactory detoxification after the perhydrolysis. Problems, such as those which could not be excluded during the previously known control of the first stage of the method by means of the redox potential, for instance if the composition of the waste water to be treated has changed substantially as regards its component substances, do not occur in the method according to the invention. As regards the amount of acid required to be used, only an amount which is equivalent to the amount of cyanide is involved, so that this amount is scarcely of consequence in economic terms.

In electroplating plants, where the method according to the invention can be used particularly advantageously, devices for pH adjustment and monitoring and for measuring the redox potential are conventionally provided. There is required for the carrying out of the method according to the invention only the combination of conventional equipment for charging a source for formaldehyde, a source for hydrogen peroxide, an acid and a base with a conventional pH and mV controller.

COMPARATIVE EXAMPLE

An electroplating waste water with a content in directly determinable cyanide of 624 mg $CN^-/l$ was treated in a known manner with an aqueous $H_2O_2$ solution (35 wt %) with potentiometric monitoring at a pH value of about 10 and use of an activator (activator CN of Degussa AG). Within 24 hours the cyanide content was only reduced to 123 mg of directly determinable cyanide per l or to 104 mg total $CN^-/l$, determined to DIN 38405, D 13.1. The amount of $H_2O_2$ added came to 22 times theoretical. The composition of the electroplating waste water and the course of the detoxification are given in Table 1.

TABLE 1

| Composition of the waste water prior to treatment: | |
| --- | --- |
| directly argentometrically determinable cyanide | 624 mg $CN^-/l$ |
| easily releasable cyanide, DIN 38405, D 13.2 | 676 mg $CN^-/l$ |
| total cyanide, DIN 38405, D 13.1 | 676 mg $CN^-/l$ |
| copper | 1 mg Cu/l |
| nickel | 6.9 mg Ni/l |
| zinc | 450 mg Zn/l |
| silver | 0.13 mg Ag/l |
| iron | 50 mg Fe/l |
| chromium | 34 mg Cr/l |
| COD | 940 mg $O_2/l$ |
| pH | 12.4 |

The iron does not occur as a complex iron cyanide, since the D 13.1 and the D 13.2 produce the same cyanide values.
Course of reaction: Treatment of 2000 ml electroplating waste water after addition of 0.2 ml activator CN (Degussa). $H_2O_2$ was added continuously.

TABLE 1-continued

| Time min. | Temp. | mV Ag/Thal | pH | ml $H_2O$ 35 wt. % | ml conc. HCL | ml NaOH 10 wt. % | mg $Cl^-/l$ direct |
| --- | --- | --- | --- | --- | --- | --- | --- |
| 0 | 21 | 300 | 12.4 | | | | |
| 10 | 22 | 335 | 10.3 | start | 4 | | |
| 70 | 23 | 365 | 10.1 | 3 | | | |
| 130 | 23 | 380 | 10.1 | 6 | | | 575 |
| 190 | 23 | 385 | 10 | 9 | | +3 | |
| 250 | 23 | 380 | 10.4 | 12 | | | 570 |
| 310 | 23 | 385 | 10.3 | 15 | | | |
| 370 | 23 | 390 | 10.2 | 18 | | | 515 |
| 430 | 23 | 400 | 10.15 | 21 | | | |
| 490 | 24 | 410 | 10.1 | 24 | | | |
| 520 | 25 | 415 | 10.1 | 25.5 | | | 475 |
| 580 | 25 | 430 | 10 | 28.5 | | +5 | |
| 660 | 25 | 415 | 10.4 | 32.7 | | | |
| 24 h | 24 | 515 | 9.85 | 72 | | | 123 |

EXAMPLE 1

The electroplating waste water according to Comparative example 1 was treated according to the invention first of all with aqueous formaldehyde (37 wt %) and concentrated hydrochloric acid, namely alternately and maintaining a pH value of about 10.3. A 35 wt % aqueous hydrogen peroxide solution was then charged continuously and 10 wt % sodium hydroxide solution periodically, a pH value of about 10.1 being maintained. The course of the reaction and the chemicals consumption are given in Table 2. The table also gives the values for the redox potential in stages (i) and (ii), measured with an Ag electrode and Thalamide reference electrode.

The amount of formaldehyde used by means of control according to the invention corresponded to 130% of theoretical, based on the easily releasable cyanide. After addition of the hydrogen peroxide—total amount 4.9 times theoretical—the content of easily releasable cyanide (DIN 38405 D 13.2) was reduced to 3.8 mg $CN^-/l$ in 9 h; this value dropped to 2.1 mg $CN^-/l$ after a further 13 h (pH end value 9.85) without addition of chemicals.

TABLE 2

2000 ml electroplating waste water + 0.2 ml activator CN; periodic addition of HCl, $H_2CO$ and NaOH; continuous addition of $H_2O_2$.
Course of reaction:

| Time Min. | Temp. °C. | mV Ag/Thal-amide | pH | ml $H_2O_2$ 35 wt. % | ml HCl conc. | ml $H_2CO$ 37 wt. % | mg $Cl^-/l$ direct |
| --- | --- | --- | --- | --- | --- | --- | --- |
| 0 | 21 | 290 | 12.3 | | +4.0 | | |
| 2 | 21 | 330 | 10.4 | | | +1 | |
| 4 | 21 | 360 | 11.0 | | +0.7 | | |
| 6 | 21 | 390 | 10.3 | | | +1 | |
| 8 | 22 | 390 | 10.8 | | +0.7 | | |
| 10 | 22 | 420 | 10.2 | | | +1 | |
| 12 | 22 | 420 | 10.6 | | +0.4 | | |
| 14 | 22 | 435 | 10.3 | | | +1 | |
| 16 | 22 | 440 | 10.6 | | +0.4 | | |
| 18 | 22 | 460 | 10.3 | | | +1 | |
| 20 | 22 | 470 | 10.3 | | | | |
| | | | | cont. addition | | ml NaOH 10wt. % | |
| 30 | 23 | 475 | 10.3 | start | | | |
| 60 | 23 | 610 | 9.7 | 3.0 | | +4 | |

TABLE 2-continued 2000 ml electroplating waste water + 0.2 ml activator CN; periodic addition of HCl, H$_2$CO and NaOH; continuous addition of H$_2$O$_2$.
Course of reaction:

| Time Min. | Temp. °C. | mV Ag/ Thal- amide | pH | ml H$_2$O$_2$ 35 wt. % | ml HCl conc. | ml H$_2$CO 37 wt. % | mg Cl$^-$/l dir- ect |
|---|---|---|---|---|---|---|---|
| 61 | 23 | 580 | 10.4 | | | | |
| 75 | 23 | 605 | 9.8 | 4.5 | | +3 | |
| 76 | 23 | 585 | 10.4 | | | | |
| 90 | 24 | 610 | 9.7 | 6.0 | | +4 | |
| 91 | 24 | 585 | 10.4 | | | | |
| 105 | 24 | 610 | 9.9 | 7.5 | | +3 | |
| 106 | 24 | 590 | 10.4 | | | | |
| 120 | 24 | 605 | 10.0 | 9.0 | | +1.5 | |
| 121 | 24 | 595 | 10.4 | | | | |
| 150 | 24 | 600 | 9.9 | 12.0 | | +2 | |
| 151 | 24 | 585 | 10.3 | | | | |
| 180 | 24 | 580 | 10.0 | 13.5 | | +1.5 | |
| 181 | 24 | 560 | 10.4 | | | | |
| 270 | 24 | 535 | 10.15 | 18.0 | | | 67 |
| 360 | 24 | 540 | 10.05 | 19.5 | | +2 | |
| 390 | 24 | 525 | 10.3 | 20.0 | | | 33 |
| 480 | 24 | 555 | 10.15 | 21.5 | | | |
| 500 | 24 | 650 | 10.1 | 21.8 | | | |
| 505 | 24 | 690 | 10.1 | 21.8 | | | |
| 510 | 24 | 740 | 10.1 | | | | |
| 540 | 24 | 730 | 10.1 | | | | |
| 1440 | 21 | 710 | 9.85 | | | | |

The following amounts of chemicals were required per l waste water:

| | |
|---|---|
| H$_2$O$_2$ 35 wt. % | 10.9 ml |
| H$_2$CO 37 wt. % | 2.5 ml |
| activator CN | 0.1 ml |
| HCl conc. | 3.1 ml |
| NaOH 10 wt. % | 10.5 ml |

EXAMPLE 2

2 l of the waste water according to comparative example were treated according to the invention. The course of the reaction and consumption figures are given in Table 3.

The main difference from Example 1 consists in the fact that the H$_2$O$_2$ solution was not added continuously, but batch-wise. In this way the easily releasable cyanide was reduced to 0.65 mg CN–/l in the unfiltered sample within 7.5 h. The consumption of formaldehyde corresponds to 130% of theoretical, that of hydrogen peroxide to 490% of theoretical. Residual cyanide (easily releasable) after 24 h in the unfiltered sample 0.33 mg CN–/l; easily releasable CN content in the treated waste water after the filtration 0.15 mg CN$^-$/l. The total cyanide content to DIN 38405 D 13.1 came to 12.3 mg CN$^-$/l after 24 h.

TABLE 3

Reaction Course:

2000 ml electroplating waste water
0.2 ml activator CN

| Time Min. | Temp. °C. | mV Ag/ Thal- amide | pH | ml H$_2$O 35 wt. % | ml HCl conc. | ml H$_2$CO 37 wt. % | mg CN$^-$/l dir- ect |
|---|---|---|---|---|---|---|---|
| 0 | 25 | 300 | 12.2 | +3.6 | | | |
| 2 | 25 | 380 | 10.2 | | | +1 | |
| 4 | 25 | 420 | 10.9 | | +0.5 | | |
| 6 | 25 | 450 | 10.4 | | | +1 | |
| 8 | 25 | 450 | 10.8 | | +0.5 | | |
| 10 | 25 | 470 | 10.4 | | | +1 | |
| 12 | 25 | 470 | 10.75 | | +0.5 | | |
| 14 | 25 | 495 | 10.35 | | | +1 | |
| 16 | 25 | 500 | 10.6 | | +0.3 | | |
| 18 | 25 | 510 | 10.35 | | | +1 | |
| 20 | 25 | 510 | 10.35 | | | | |

| | | | | | ml NaOH 10wt. % | | |
|---|---|---|---|---|---|---|---|
| 30 | 25 | 510 | 10.35 | +4 | | | |
| 35 | 25 | 610 | 9.9 | | | +5 | |
| 36 | 26 | 600 | 10.45 | | | | |
| 60 | 26 | 635 | 9.7 | | | +4 | |
| 90 | 26 | 600 | 10.45 | +4 | | | |
| 91 | 27 | 605 | 9.9 | | | +4 | |
| 120 | 27 | 630 | 9.85 | | | +3 | |
| 150 | 27 | 610 | 10.3 | +4 | | | |
| 170 | 27 | 615 | 9.85 | | | +3 | |
| 210 | 27 | 565 | 10.25 | +4 | | | 73 |
| 270 | 27 | 560 | 10.0 | +2 | | | 52 |
| 330 | 27 | 565 | 9.95 | +2 | | | 31 |
| 350 | 27 | 570 | 9.85 | | | +3 | |
| 390 | 28 | 550 | 10.04 | +2 | | | 10 |
| 410 | 28 | 730 | 10.3 | | | | |
| 420 | 28 | 720 | 10.25 | | | | |
| 450 | 28 | 720 | 10.2 | | | | |

The following amounts of chemicals were required per l waste water:

| | |
|---|---|
| H$_2$O$_2$ 35 wt. % | 11.0 ml |
| H$_2$CO 37 wt. % | 2.5 ml |
| activator CN | 0.1 ml |
| HCl conc. | 2.7 ml |
| NaOH 10 wt. % | 11.0 ml |

EXAMPLE 3

An electroplating waste water with the composition according to Table 4 was detoxified according to the invention. The course of the reaction, the chemicals consumption and the results are given in Table 4. After 6.75 h the content in easily releasable cyanide of 1260 mg CN$^-$/l was reduced to 2.3 mg CN$^-$/l, the H$_2$O$_2$ consumption coming to 1.8 times theoretical.

TABLE 4

| Composition of the waste water prior to treatment: | |
|---|---|
| directly argentometrically determinable cyanide | 1270 mg CN$^-$/l |
| easily releasable cyanide, DIN 38405, D 13.2 | 1260 mg CN$^-$/l |
| total cyanide, DIN 38405, D 13.1 | 1410 mg CN$^-$/l |
| copper | 1.8 mg Cu/l |

TABLE 4-continued

| | |
|---|---|
| nickel | <0.5 mg Ni/l |
| zinc | 1100 mg Zn/l |
| silver | <0.5 mg Ag/l |
| iron | 18 mg Fe/l |
| chromium | <0.5 mg Cr/l |
| pH | 12.9 |

Reaction course: 4000 ml electroplating waste water after addition of 0.4 ml activator CN

| Time Min. | Temp. °C. | mV Ag/ Thalamide | pH | ml $H_2O_2$ 50 wt. % | ml HCl conc. | ml $H_2CO$ 37 wt. % | mg $CN^-$/ direct | Oa *) mg/l |
|---|---|---|---|---|---|---|---|---|
| 0 | 24 | 200 | 12.9 | | | | | |
| 5 | 27 | 360 | 10.1 | 60 | | | | |
| 6 | 27 | 360 | 10.0 | | | +2 | | |
| 8 | 27 | 360 | 10.3 | | +2 | | | |
| 10 | 27 | 370 | 10.0 | | | +2 | | |
| 12 | 27 | 370 | 10.2 | | +2 | | | |
| 14 | 27 | 380 | 9.9 | | | +2 | | |
| 16 | 27 | 380 | 10.05 | | +1 | | | |
| 18 | 27 | 385 | 9.95 | | | +2 | | |
| 20 | 27 | 385 | 10.1 | | +1 | | | |
| 22 | 27 | 390 | 9.9 | | | +2 | | |
| 24 | 27 | 390 | 10.1 | | +1 | | | |
| 26 | 27 | 395 | 9.95 | | | +2 | | |
| 28 | 27 | 395 | 10.01 | | +1 | | | |
| 30 | 27 | 400 | 10.0 | | | +2 | | |
| 32 | 27 | 405 | 10.1 | | +1 | | | |
| 34 | 27 | 415 | 10.0 | | | +2 | | |
| 36 | 27 | 430 | 10.05 | | +1 | | | |
| 38 | 27 | 440 | 9.9 | | | +2 | | |
| 40 | 27 | 470 | 9.9 | | | ml NaOH 10 wt. % | | |
| 45 | 27 | 470 | 9.9 | +4 | | | | |
| 60 | 28 | 500 | 9.5 | | | +30 | | |
| 62 | 28 | 460 | 10.0 | | | | | >25 |
| 75 | 28 | 460 | 10.0 | | | | | >25 |
| 105 | 29 | 460 | 9.9 | +4 | | | 842 | |
| 110 | 29 | 480 | 9.7 | | | +20 | | |
| 112 | 29 | 455 | 10.0 | | | | | |
| 130 | 30 | 490 | 9.6 | | | +20 | | |
| 132 | 30 | 470 | 10.0 | | | | | |
| 165 | 30 | 475 | 9.9 | +4 | | | 525 | |
| 175 | 30 | 520 | 9.5 | | | +20 | | >25 |
| 177 | 30 | 480 | 10.0 | | | | | >25 |
| 195 | 30 | 510 | 9.6 | | | +20 | | |
| 197 | 30 | 480 | 10.0 | | | | | |
| 225 | 30 | 485 | 9.8 | +4 | | | 254 | |
| 230 | 30 | 580 | 9.6 | | | +20 | | |
| 235 | 30 | 500 | 10.0 | | | | | |
| 250 | 30 | 540 | 9.6 | | | +20 | | >25 |
| 255 | 30 | 510 | 10.0 | | | | | |
| 285 | 30 | 510 | 9.8 | +4 | | | | |
| 290 | 30 | 670 | 9.6 | | | +20 | | |
| 295 | 30 | 650 | 10.0 | | | | | >25 |
| 315 | 30 | 700 | 9.9 | | | | <3 | >25 |
| 345 | 30 | 700 | 9.8 | | | | | >25 |

Result:

| | |
|---|---|
| easily releasable cyanide, DIN 38405 D 13.2 (unfiltered) | 2.3 mg $CN^-$/l |
| easily releasable cyanide, DIN 38405 D 13.2 (filtered) | 2.2 mg $CN^-$/l |
| Total cyanide, DIN 38405 D 13.1 | 146.0 mg $CN^-$/l |
| easily releasable cyanide after 20 h, DIN 38405 D 13.2 (unfiltered) | 1.3 mg $CN^-$/l |

*The Oa determination was carried out with $H_2O_2$ test rods.

Chemicals consumption per 1 waste water

| | |
|---|---|
| $H_2O_2$ 50 wt. % | 5.0 ml |
| $H_2CO$ 37 wt. % | 4.5 ml |
| activator CN | 0.1 ml |
| HCl conc. | 17.5 ml |
| NaOH 10 wt. % | 42.5 ml |

Further variations and modifications of the foregoing invention will be apparent to those skilled in the art and are intended to be encompassed by the claims appended hereto.

German application P 43 44 598.5 is relied on and incorporated herein by reference.

I claim:

1. A method for controlling the detoxification of an aqueous solution containing cyanides, unstable heavy-metal cyano complexes or mixtures thereof, comprising the stages (i) adding a source for formaldehyde to said aqueous solution to be treated at a pH value in the range from 8.5 to 12, thereby converting free and released cyanide into glycolnitrile, keeping the pH value substantially constant by a pH-controlled addition of an acid, discontinuing the adding of formaldehyde if the pH value no longer increases as a result of said adding, and afterwards (ii) subjecting said glycolnitrile to perhydrolysis by adding a source for hydrogen peroxide at a pH value in the range from 8.5 to 12, measuring the redox potential, discontinuing adding if the redox potential no longer increases with the pH value kept constant, said method being carried out without cyanide determination prior to said detoxification.

2. The method according to claim 1, wherein in stages (i) and (ii) a pH value in the range from 9.5 to 10.5 is adjusted and kept constant.

3. The method according to claim 1 wherein the pH control is undertaken with the use of P-, PI- or PID controllers.

4. The method according to claim 1 wherein the aqueous solution is a waste water containing zinc cyano complexes.

5. The method according to claim 1 wherein stage (i) is carried out with continuous or periodic-addition of the source of formaldehyde.

6. The method according to claim 1 wherein stage (ii) is carried out with continuous or periodic addition of the source of hydrogen peroxide.

7. The method according to claim 1 wherein said acid is a mineral acid.

8. A method for controlling the detoxification of an aqueous waste water solution containing a cyanide, unstable heavy-metal cyano complex or mixtures thereof, comprising the stages:

(i) adding to said aqueous solution a source for formaldehyde and an acid in an alternating manner so as to maintain a pH value in the range from 8.5 to 12, thereby to convert free and released cyanide into glycolnitrile, keeping the pH value substantially constant by a pH-controlled addition of an acid, discontinuing the adding of formaldehyde if the pH value no longer increases as a result of said adding, and afterwards (ii) adding a source of hydrogen peroxide to said solution to thereby carry out perhydrolysis of the glycolnitrile and maintaining a pH value in the range from 8.5 to 12, (iii) measuring the redox potential and discontinuing the adding of the source of hydrogen peroxide if the redox potential no longer increases with the pH value kept constant, said method being carried out without cyanide determination prior to said detoxification.

9. The method according to claim 8 wherein the pH control is undertaken with the use of P-, PI- or PID controllers.

* * * * *